(12) United States Patent
Tomka

(10) Patent No.: US 6,299,246 B1
(45) Date of Patent: Oct. 9, 2001

(54) PLASTIC MOLDED PART AND CONSTRUCTION STRUCTURE

(75) Inventor: Ivan Tomka, Zollikon (CH)

(73) Assignee: RCC Regional Compact Car AG, Zurich (CH)

( * ) Notice: Subject to any disclaimer, the term of this patent is extended or adjusted under 35 U.S.C. 154(b) by 0 days.

(21) Appl. No.: 09/269,496

(22) PCT Filed: Oct. 7, 1997

(86) PCT No.: PCT/CH97/00379

§ 371 Date: Mar. 29, 1999

§ 102(e) Date: Mar. 29, 1999

(87) PCT Pub. No.: WO98/15404

PCT Pub. Date: Apr. 16, 1998

(30) Foreign Application Priority Data

Oct. 8, 1996 (CH) .................................................... 2444/96

(51) Int. Cl.⁷ .................................................. B62D 25/00
(52) U.S. Cl. .......................... 296/901; 296/205; 264/250
(58) Field of Search ................................. 296/901, 205; 264/250; 293/120, 122

(56) References Cited

U.S. PATENT DOCUMENTS

| | | | |
|---|---|---|---|
| 4,045,075 | * | 8/1977 | Pulver .................................. 296/205 |
| 4,491,362 | * | 1/1985 | Kennedy ........................... 296/901 X |
| 4,613,177 | * | 9/1986 | Loren et al. ......................... 293/120 |
| 4,976,490 | * | 12/1990 | Gentle .............................. 296/205 X |
| 5,009,463 | * | 4/1991 | Saitoh et al. ..................... 296/901 X |
| 5,041,318 | * | 8/1991 | Hulls ................................ 296/901 X |
| 5,139,297 | * | 8/1992 | Carpenter et al. ............... 293/122 X |
| 5,318,819 | * | 6/1994 | Pai ................................... 296/205 X |
| 5,403,063 | * | 4/1995 | Sjosdedt et al. ...................... 296/187 |
| 5,762,395 | * | 6/1998 | Merrifield et al. ................... 296/203 |
| 5,806,919 | * | 9/1998 | Davies ................................. 296/205 |

* cited by examiner

Primary Examiner—Joseph D. Pape
(74) Attorney, Agent, or Firm—Francis C. Hand, Esq.; Carella, Byrne, Bain, Gilfillan, Cecchi & Olstein

(57) ABSTRACT

The plastic moulding and design structure has a load-bearing structure (3), which is wholly or partly surrounded by a polymer material (8) forming the moulding. The load-bearing structure (3) is formed from several interconnected, high strength, continuous fibre-reinforced structural elements (5). Thus, in a simple and inexpensive manner it is possible to produce structures with the most varied shapes such as containers, tanks, vehicle frames, etc.

19 Claims, 4 Drawing Sheets

PLASTIC MOLDED PART AND CONSTRUCTION STRUCTURE

Figure 1:
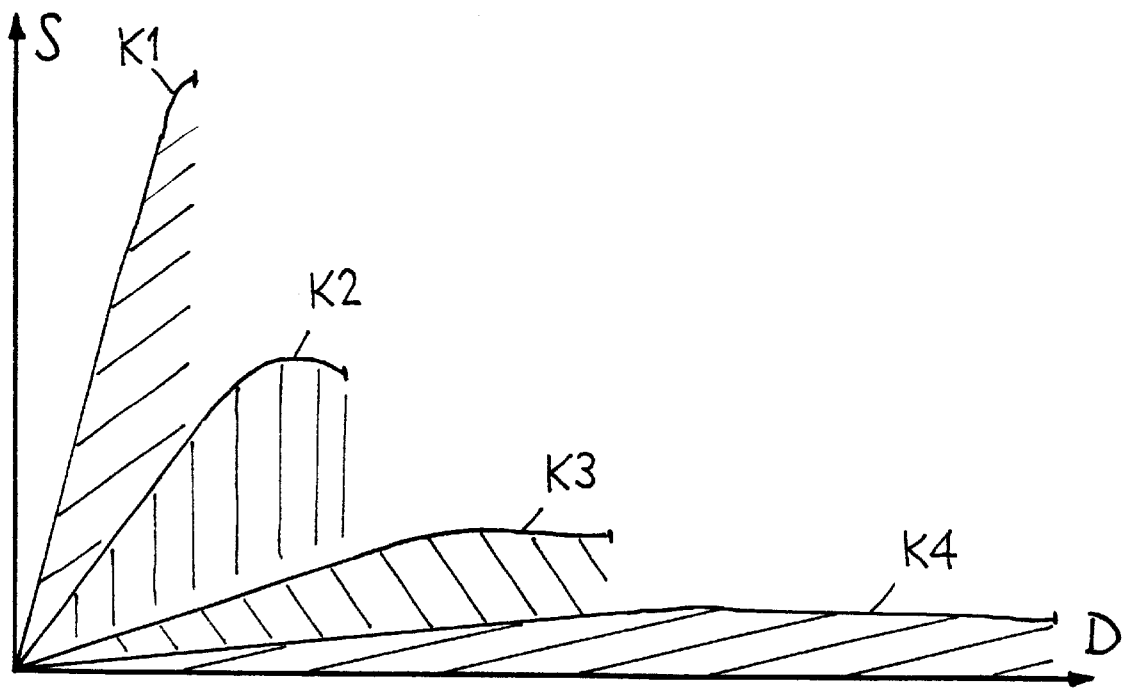

The present invention relates to a plastic moulding and to a design structure such as a container, casing, gas or liquid tank, pipeline, vehicle frame, cabin, body, etc., as well as to a method for the manufacture of such a plastic molding and design structure for producing car bodies, containers, cable cars, fuel tanks, etc., i.e. moldings, which simultaneously form a load-bearing design structure.

Casings, cabins, bodies, large containers, fuel tanks, etc. are still generally made using metallic materials, such as e.g. metal sheets, steel structures, etc. As a result of the high weight, corrodibility, relatively expensive manufacturing process and complicated handling operations ever increasing efforts are being made to use lighter and more easily processable materials, such as plastics or in general polymers, or plastic structures.

Thus, e.g. for containers, plastic fuel tanks pipelines, vehicle frames, etc. use is made of so-called winding processes, where e.g. liquid resin-impregnated rovings, glass filaments or plastic fibres, fabric tapes, etc. are wound round a core in a mold, where curing takes place. On the one hand shaping is only possible to a very limited extent and on the other the resulting articles can scarcely be machined or finished. They also do not have a smooth surface and in order to obtain an adequate strength relatively large wall thicknesses must be chosen.

According to another known process, in large dies are loosely placed continuous reinforcing fibres, textile fibre structures such as fibre mats, plates and semifinished fibre structures and the like, but only a very limited bearing function can be achieved. Alternatively, there is a whole body fibre reinforcement by incorporating short fibres in the thermoplastic material to be processed. Either these production processes are very complicated and expensive, or the merely short fibre-reinforced plastics nowhere near provide the necessary strength of the design structure to be produced.

According to another variant, mats or plates produced by a deep drawing process from fibre-reinforced duromers are brought into the necessary form or shape and final curing then takes place in a mold or die or by after-annealing. However, this only permits a very limited shaping and only a limited support or bearing function. These parts also do not have an acceptable surface finish and generally the reaction time during curing is also too long.

The problem of the present invention is therefore to overcome the disadvantages of the known processes and to provide a plastic molding and support structure, together with a process for the production thereof, which can be implemented simply and inexpensively using lightweight polymer materials and with which it is possible to carry out further shapings and load-bearing functions.

According to the invention, the set problem is solved by a plastic molding and design structure. Briefly, the invention is directed to a structure which is comprised of a plurality of interconnected fiber-reinforced plastic structural elements defining a load bearing structure and at least one layer of thermolastic polymer material intergrally connecting to and between at least some of the structural elements.

The plastic moulding and design structure is formed from simple, single, high strength, fibre-reinforced structural elements, which are combined to a bearing structure and interconnected and in which a molding-forming polymer material is molded around at least parts of the bearing structure. Thus, in simple manner and from relatively inexpensive material sold by the meter, structural elements and design structures in random form are produced and the desired shaping and surface is obtained in a simple manner by molding or extruding the polymer material. In addition, short cycle times can be achieved. In principle, largely random flat shapes and load-bearing functions of the integrated, bearing structure can be produced. Complete molding or extruding round the bearing structure with the polymer material leads to a completely protected, smooth surface. However, e.g. for large space lattice structures, only partial areas need be molded round with the polymer material and in particular at the junction points of the structural elements.

The reinforcing fibres for the structural elements forming the load-bearing structure are, more particularly, suitable continuous fibre reinforcements of glass fibres, carbon, polypropylene, polyethylene, aramide or other high strength polymer fibres. The matrix for the reinforcing fibres are preferably thermoplastics such as polyamide (PA), polypropylene (PP), polyethylene terephthalate (PET), polybutylene terephthalate (PBT), polycarbonate (PC), polyimide (PI), polyacrylates, polyphenylene sulphide (PPS) and polyether ether ketone (PEEK). At least partly, suitable are duromer materials, such as e.g. polyurethane (PUR), unsaturated polyester resins, epoxy resins, phenolic resins, amino plastics and optionally novolak resins.

In the case of these structural elements forming the load-bearing structure they can e.g. be longitudinally oriented structures such as rods, pipes, longitudinal sections, such as T-sections, L-angles and flat structures such as plates, mats, honeycombs, grids, etc. These structural elements can in general be produced by standard plastics technology manufacturing methods, preferably by pultrusion, extrusion, injection molding or calendering. Preferably these structural elements are produced by cutting to size, finishing and assembling "continuous" material.

For the production of the load-bearing structure, the individual structural elements are joined together by pinning, screwing, bonding, welding, etc. and in the junction area can be located appropriate coupling or connecting elements.

The individual structural elements can be assembled in multilayer form, with at least one high strength core and an outermost layer, which is preferably compatible with the polymer material directly surrounding the element or in which the outermost layer adheres well or can be readily connected to or mixed with the polymer material directly surrounding the element. Good adhesion between structural elements and thermoplastic polymer material is obtained by compatible polymer materials, which diffuse into one another and are consequently microscopically connected, or by chemical bonds.

According to a preferred variant, the outermost layer of the individual structural elements or the surface thereof is at least approximately identical with the polymer material directly surrounding the element. It is also possible to use polymer blends.

The polymer material forming the molding or the design structure at least partly incorporates a thermoplastic polymer such as polyamide (PA), polypropylene (PP), polyethylene terephthalate (PET), polybutylene terephthalate (PBT), polycarbonate (PC), polyimide (PI), polyacrylates, polyphenylene sulphide (PPS), or polyether ether ketone (PEEK). In principle, use is made of substantially the same polymers as for the thermoplastic matrix or the coating of the structural elements. The polymer material can have a multi-layer structure with decreasing rigidity and strength from the element to the surface of the molding or design structure. It is also possible for the polymer material to be at least zonally foamed or dyed.

The decreasing rigidity and strength from the structural element towards the outer surface of the polymer material is important, so that if damage occurs or there is deformation to the molding and design structure, a very high energy absorption is guaranteed. Particularly in the manufacture of vehicle frames, car bodies, cabins and the like, it is important that the moldings and design structure forming the body in the so-called crash tests lead to a particularly high energy absorption, so that e.g. a person located in a car or cabin can be given maximum protection.

The invention is described in greater detail hereinafter relative to embodiments with reference to the attached drawings, wherein show:

FIG. 1 Stress-strain diagrams of different materials used.

Figure 2:
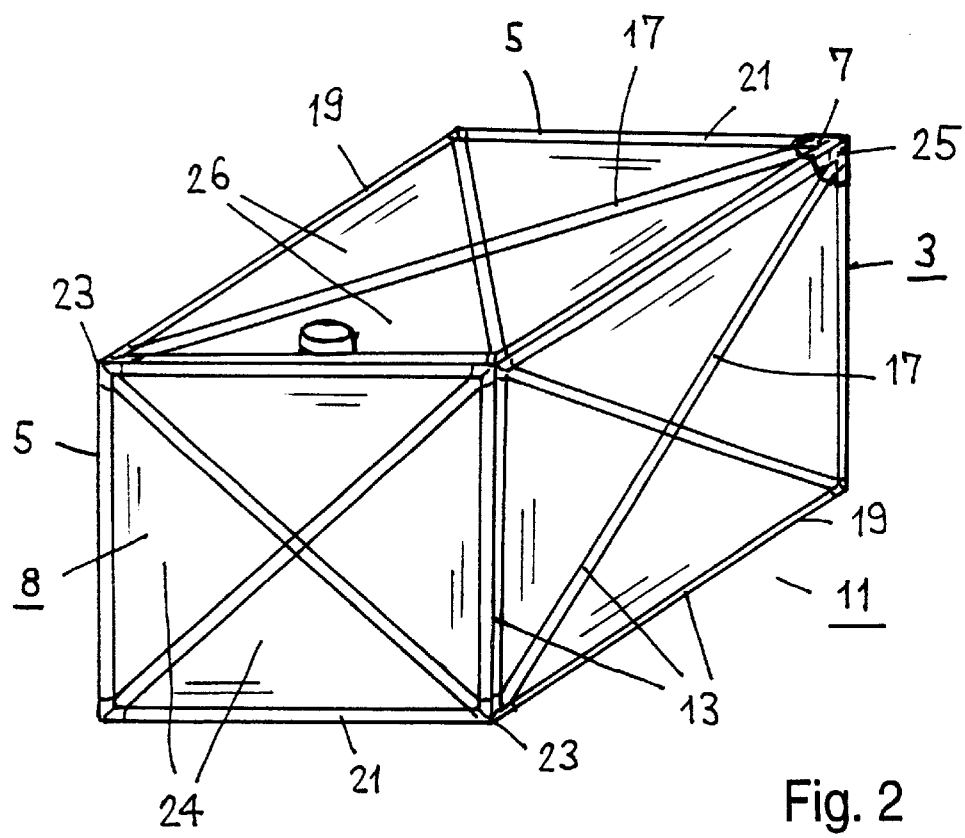

FIG. 2 A liquid tank as an example of an inventive plastic molding and design structure.

Figure 3A:
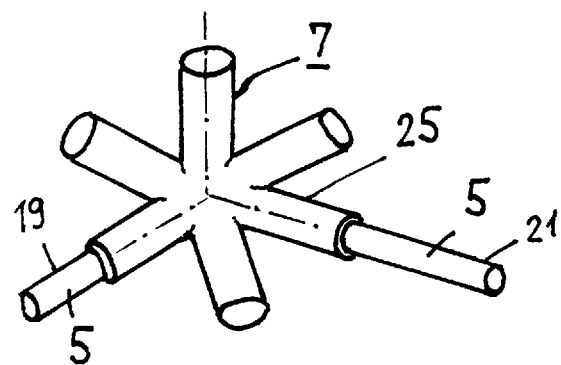
Figure 3B:
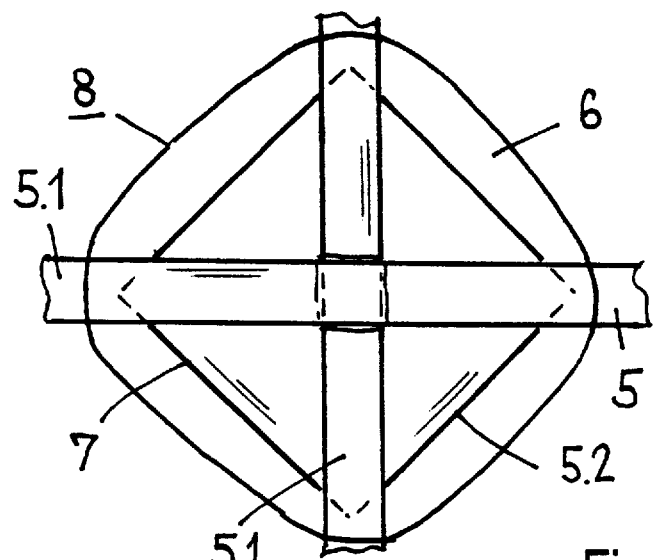
Figure 3C:
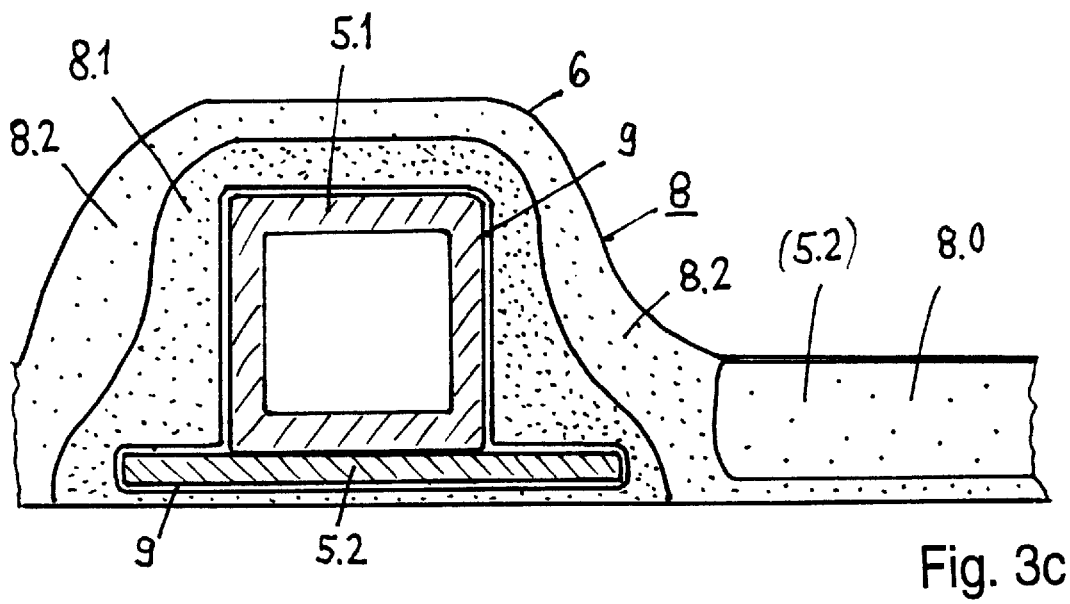

FIGS. 3a–c Examples of connections, connecting elements and areas of the load-bearing structure.

Figure 4:
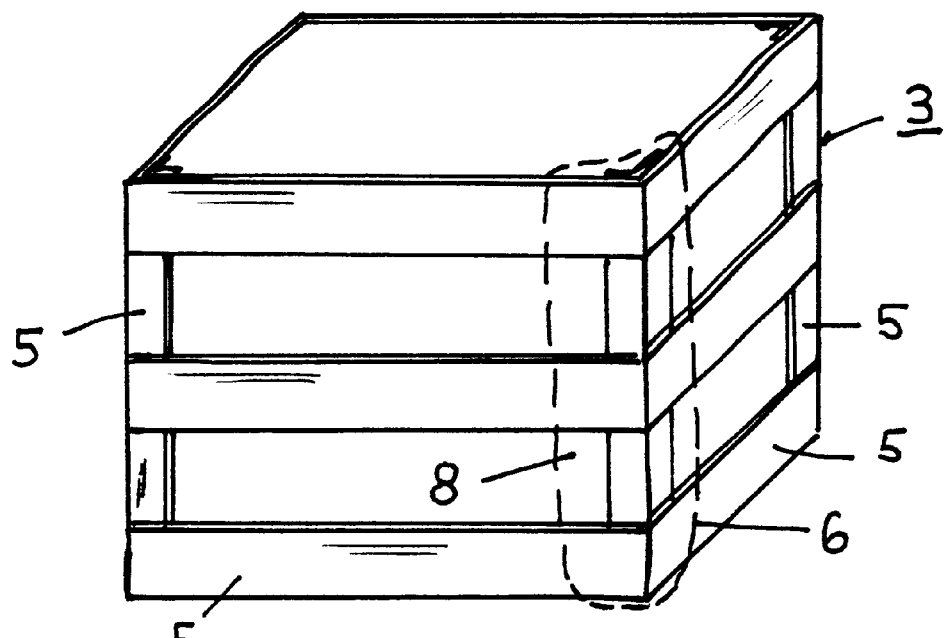

FIG. 4 A container with a crate-like load-bearing structure.

Figure 5:
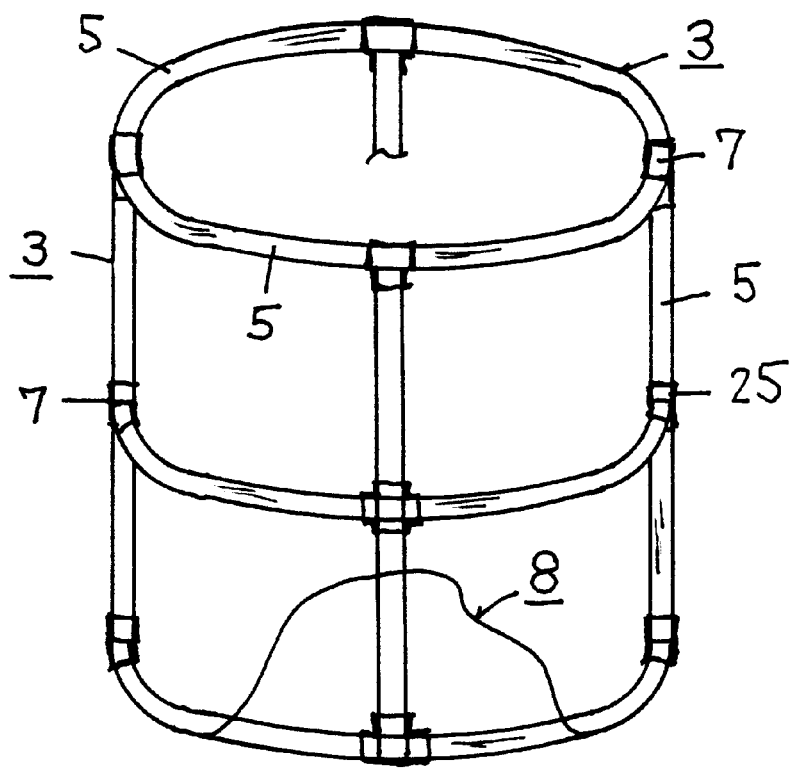

FIG. 5 A cylindrical load-bearing structure, e.g. as a circular tank.

Figure 6:
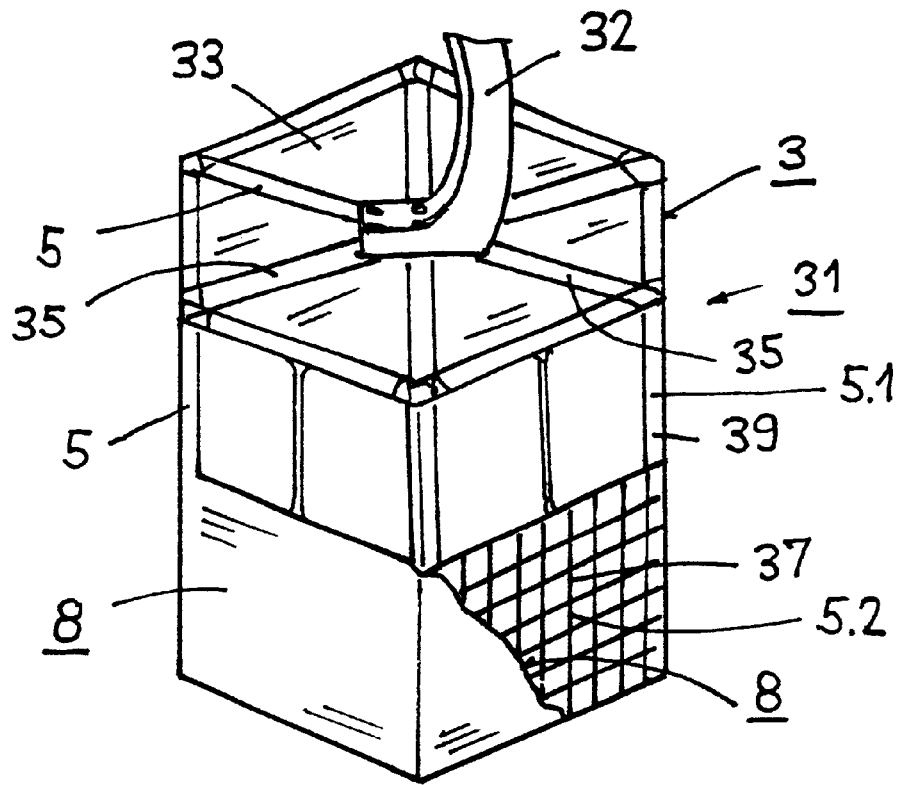

FIG. 6 A cable car.

Figure 7:
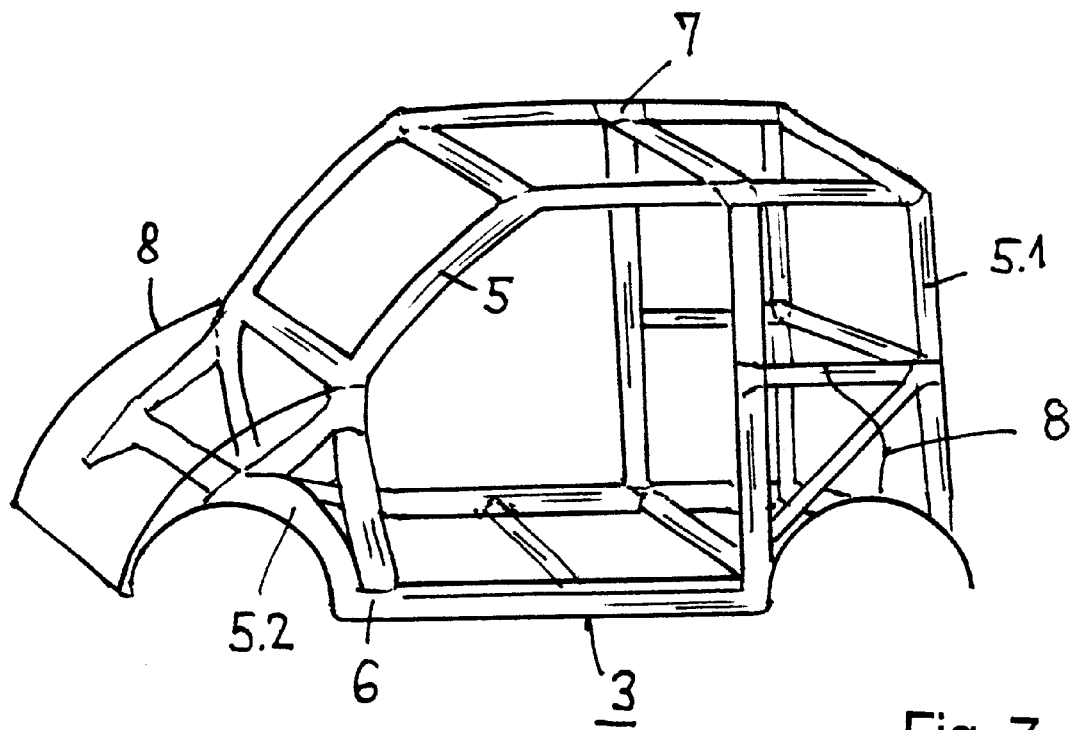

FIG. 7 A vehicle frame with body part areas.

FIG. 1 shows a stress-strain diagram by means of which the above facts will be described. Curve K1 shows the stress-strain behavour S(D) of a high strength, high rigidity material, a structural element, such as e.g. a matrix material reinforced with continuous fibres, e.g. an epoxy resin reinforced with 50% carbon fibres. Curve K2 shows a thermoplastic material reinforced by short fibres. Curve K3 shows the S(D) behaviour of the unreinforced thermoplastic material and curve K4 the stress-strain behaviour of a so-called integral foam, such as e.g. a polycarbonate foam.

The energy absorption of the individual materials up to break is represented by the hatched area located below the curve. It is consequently important that the area beneath the individual curves is as large as possible, which occurs if there is a choice of a highly stepped stress-strain relationship from the core of the individual structural elements (e.g. curve K1) to the outer surface of the moulding (e.g. curve K3, K4). In other words it is advantageous if the rigidity of the selected materials decreases from the core of the individual structural elements towards the surface of the molding. However, it is naturally also important that the individual, selected materials are mutually compatible, so that in the case of energy absorption, no separation or break occurs at interfaces.

For the manufacture of moldings and design structures initially the manufacture of the individual structural elements is used as a basis. For example pultrusion or continuous extrusion of pipes, rods, sections, etc. is used as a basis and the continuous materials are then subdivided into the desired length. Thermoplastic continuous fibre-reinforced structural elements are e.g. produced by pultrusion. In the case of extrusion, e.g. continuous fibre-reinforced duromer materials are extruded, which either rapidly cure through corresponding additives or which are hardened by aftertreatment, such as afterannealing, UV treatment, etc. It is also possible to produce these continuous materials by coextrusion, in that, as described hereinbefore, the structural elements have a multilayer construction. The inner core can e.g. comprise the fibre-reinforced, duromer material, whereas the outermost layer is at least partly made from a thermoplastic material, such as e.g. polypropylene, polycarbonate and the like. It is naturally important that the individual material layers adhere well to one another and are mutually compatible.

Good adhesion can on the one hand be achieved by adhesion to the boundary layer or interface or by interdiffusion of the molecules in the two halves on either side of the boundary layer. The latter can e.g. be brought about in that duromers on the surface are not completely cured or by placing meltable thermoplastics on the surface. Good adhesion is also obtained in that on the boundary layer there is a chemical reaction between the two polymers forming the boundary layer or between the molecules of the polymers. It is finally possible to place a priming connecting layer (9 in FIG. 3c) between the two polymers.

After production of the individual structural elements, such as e.g. rods, plates, pipes, T-sections, etc., the elements are assembled or combined to form the load-bearing structure. This can e.g. take place by assembly using connecting elements, which can have plug-in portions, screwing portions, locking portions, etc. These connecting elements can either be rigid or articulated, so that the resulting load-bearing structure is either rigid or can have a certain pliability. Joining together is also directly possible, in that the individual structural elements are bonded, welded, screwed, etc. together. It is important that at least part of the structural elements of the load-bearing structure is interconnected.

Following the production of the load-bearing structure, it is placed in a mold or die and then the preferably thermoplastic polymer material is molded or extruded. It is important that the polymer melt to be moulded or extruded is compatible with the outermost layer of the structural elements of the load-bearing structure or that the surface of the load-bearing structure connects well to the polymer melt. As it is now possible to construct in multilayer form the polymer material for the formation of the molding or the design structure, after curing has taken place of the molded or extruded polymer material either the now enveloped, load-bearing structure is introduced into a further mold or die, or the volume of the existing mould or die can be increased by providing slide elements in the walls. These constitute so-called multiple cavity molds, which allow the molding or extrusion of several polymer materials for forming a multilayer molding.

It is also possible in this way to bring about the above-described rigidity change from the inside to the outside, in that e.g. towards the outside polymer materials such as e.g. polyethylene-polypropylene copolymers, polyesters such as PBT or Topas (polymerized cyclic vinyl monomers) are extruded, which have a relatively limited rigidity and also give a very good surface finish, so that the final molding or design structure does not require finishing. This also makes it possible to dye the outermost layer, so that there is no need to paint the finally produced molding or design structure.

In order to obtain a very lightweight molding and design structure, it is advantageous to at least partly foam the polymer material. So-called structural foams, e.g. of polycarbonate, polyurethane or polyesters such as PBT or Topas are suitable and they have excellent weight, strength and hardness characteristics, i.e. have a relatively high surface strength for a low weight.

The major advantage when using polymeric materials according to the present invention is that, as stated hereinbefore, there is no need to finish or rework the surface of the molding or design structure produced. It is also possible to obtain special surface effects, such as e.g. the dyeing of the polymer, which makes painting unnecessary. It is also possible to imitate the so-called "acrylic paint touch", or surface structures can be shaped in during molding or extrusion.

Further major advantages are subsequently obtained in that the moldings produced in this way, e.g. vehicle bodies, cannot rust or corrode. Scratches which occur are scarcely visible and do not lead to the rusting of the body. Scratches can also be reground, so that they are no longer visible.

Another advantage is that such moldings, such as e.g. casings, tanks, bodies, etc. are easily recyclable, in that the polymer material can be regranulated by melting and the fibre-reinforced structural elements can be used again, e.g. as fibre reinforcement.

The fundamental idea of the present invention is to initially produce a frame or load-bearing structure from material sold by the meter and the individual structural elements thereof can be manufactured in a simple, inexpensive manner and the elements can e.g. be assembled using robots.

Unlike in the known, conventional whole body fibre reinforcement with inserted mats or the aforementioned winding process, according to the invention the structural elements are assembled in a simple manner to form a load-bearing structure or frame, which guarantees a much higher strength and dimensional stability of the ultimate moulding. It is also possible according to the invention to use flat structural elements such as mat or honeycomb structures, it being important that they can be interconnected and also connected to further structural elements.

FIG. 2 shows a liquid tank 11 as an example of an inventive plastic molding and design structure, the walls being shown in transparent form, so as to render visible the load-bearing structure 3. The load-bearing structure 3 comprises a space lattice frame 13 with diagonal bars 17, together with longitudinal bars 19 and crossbars 21 as structural elements 5, which serve to strengthen or brace the individual walls. In the corners 23 of the liquid tank 11 the individual structural elements or bars are interconnected, which can e.g. take place by means of a plug-in connecting part 25 as the connecting element 7, as shown in FIG. 3a. The longitudinal bars 17, 19 and 21 can e.g. be polyurethane resin bars reinforced by carbon fibres, which are surface-coated or surface-treated, in order to ensure a better adhesion of the polymer material surrounding the individual bars. These structural elements 3 can also have other profile shapes, e.g. can be formed as pipes. By means of the aforementioned polymer material 8, the gaps 24 and 26 as walls between the bars are e.g. filled by extrusion.

FIGS. 3a to 3c illustrate connections, connecting elements 7 and connecting areas 6 of different types of bar-like, longitudinally oriented (5.1) and flat (5.2) structural elements, which in an appropriate selection and combination form the load-bearing structure 3.

FIG. 3a shows as a connecting element 7 a plug-in connecting part 25 with which e.g. the bars 17, 19, 21 of FIG. 2 are connected by plugging and bonding in.

FIG. 3b shows in plan view a connection of two crossing longitudinal sections, e.g. in the form of square tubes as structural elements 5, which are bonded onto a plate as a flat connecting element 7 and in which everything is surrounded and held together e.g. by a fibre-reinforced polymer material 8 as a partial area molding, which here forms a connecting area 6.

FIG. 3c illustrates in cross-section a connection of a square pipe section as a longitudinally oriented structural element 5.1, which is bonded or welded onto a plate as a flat structural element 5.2. A wall area is connected, which can e.g. comprise a polymer material 8 with foamed partial areas 8.0 or which can contain further flat structural elements 5.2, such as grids or honeycombs. The surrounding, shape-forming polymer material 8 here again forms a reinforcing connecting area 6. The polymer material can also comprise two or more layers 8.1, 8.2. Once again there is a connecting layer 9 for providing a very strong connection between the structural elements and polymer material to the structural elements 5.1 and 5.2, e.g. forming the outermost layer thereof. The molded round polymer material e.g. comprises a stronger, fibre-reinforced layer 8.1, on which is subsequently molded a further, unreinforced polymer layer 8.2, whose stress-strain behaviour corresponds to the curves of FIG. 1: $8.1=K2$, $8.2=K3$, as well as polymer foam $8.0=K4$.

The walls of a container can also e.g. be supported by lath-like, i.e. flat structural elements as struts, as is e.g. shown in the case of the crate-like container of FIG. 4. It is important that the individual structural elements, which form the load-bearing structure, can be produced "continuously", e.g. by pultrusion or extrusion from continuous fibre-reinforced, thermoplastic or duromer material. For the case that particularly high strength, rigid structural elements having a very high modulus are required, a particularly high proportion of continuous fibre reinforcement, e.g. 50 to 60 vol. % can be used. It is also advantageous to at least partly use so-called novolaks, which give a higher crosslinking density than commercial duromers.

The continuous fibre reinforcements can be constituted by all the aforementioned fibres and must be substituted prior to incorporation into the matrix polymer, so that its surface can be readily wetted by the polymer enclosing these fibres. However, this is a known procedure, because the prior art already discloses the reinforcement of thermoplastics and duromers, e.g. with glass, carbon and aramide fibres and the like.

It would finally also be possible to provide the individual walls, in addition to the bracing elements, with honeycomb structures in the gaps 24, 26. It is important that these honeycomb structures are connected to the other structural elements 17, 19, 21 (in FIG. 2).

Another example of such a load-bearing structure 3 is shown in FIG. 5 with curved, longitudinally oriented sections or pipes as structural elements 5 and with connecting elements 7, 25, e.g. for forming the wall of a basin, very large diameter pipe, pressure tank, etc.

FIG. 6 shows a cable car 31, whose load-bearing base frame is formed by a load-bearing structure 3 according to the invention. Increased demands are in particular made with respect to the strength of the base and roof structure, to which a support arm 32 is fixed, so that the roof 33 contains structural elements as reinforcing elements 35, which have larger dimensions than e.g. the reinforcing elements in the side walls. It is e.g. also possible to use as a reinforcing element in the side walls, relatively small dimensioned, grid-like structures 37 as a further example of flat structural elements 5.2, which are fixed in a frame 39 of the load-bearing structure 3.

FIG. 7 shows as a further example a car frame 41 with a high strength, load-bearing structure. The latter comprises strong, longitudinally oriented structural elements 5.1 connected to flat parts 5.2, partial areas of the load-bearing structure being able to form with the surrounding polymer material 8 car body parts. This makes it possible to produce a self-supporting plastic body.

In the possible applications of the invention illustrated in FIGS. 2 to 7, these naturally only constitute examples, which can be changed, modified or supplemented in any random way. In particular, the represented reinforcing or structural elements 5 for forming the inventive, load-bearing structures 3 have merely been chosen for further illustrating the invention. It is naturally possible to use in place of the pipes or rods, vertical frame members, grids and laths, shown in FIGS. 2 to 7, by other reinforcing elements, such as e.g. T-sections, U-sections, L-angles, etc. or to use laminates, mats, honeycombs, etc. as flat structural elements.

The exemplified uses given also merely illustrate the invention and the inventive idea can also be applied to the manufacture of random other casings, receptacles, cabins, cars, containers, bodies, etc., which must fulfil load-bearing functions.

For the manufacture of a molding and design structure, essentially comprising a polymeric material, it is important to initially form a load-bearing structure, which is subsequently enveloped or encased, at least in partial areas, with the polymeric material forming the molding and design structure. Both the individual structural elements forming the load-bearing structure and also the polymer material ultimately forming the molding, can be in one or multiple layer form or can be constituted by several components.

What is claimed is:

1. A structure comprising
   a plurality of interconnected fiber-reinforced plastic structural elements defining a load bearing structure; and
   at least one layer of thermoplastic polymer material integrally connected to and between at least some of said structural elements.

2. A structure as set forth in claim 1 wherein each respective structural element is formed from a continuous length of fiber-reinforced plastic material.

3. A structure as set forth in claim 1 wherein each structural element has a continuous fiber reinforcement therein.

4. A structure as set forth in claim 3 wherein said reinforcement is selected from the group consisting of filaments of glass, carbon aramide and LC polymer.

5. A structure as set forth in claim 3 wherein each structural element has a matrix polymer surrounding said continuous fiber reinforcement therein.

6. A structure as set forth in claim 5 wherein at least one of said structural elements is of multi-layer construction wherein each layer is made of a different plastic material from the other layers and is integral with an adjacent layer.

7. A structure as set forth in claim 6 wherein said one structural element has a inner core of fiber-reinforced duromer material and an outermost layer of thermoplastic material.

8. A structure as set forth in claim 1 where a plurality of layers of thermoplastic polymer material are integrally connected to and between at least some of said structural elements.

9. A structure as set forth in claim 8 wherein an outermost layer of said plurality of layers is selected from the group consisting of polyethylene, polypropylene copolymers and polyesters.

10. A structure as set forth in claim 8 wherein an outermost layer of said plurality of layers has a lower rigidity than an innermost layer of said plurality of layers.

11. A structure as set forth in claim 8 wherein an outermost layer of said plurality of layers is at least partly foamed.

12. A structure as set forth in claim 1 wherein each structural element is formed of a matrix polymer with continuous fiber reinforcement therein and said layer of thermoplastic polymer material is adhered to said matrix polymer.

13. A structure as set forth in claim 12 wherein said matrix polymer is a thermoplastic selected from the group consisting of polyamide, polypropylene, polyethylene terephthalate polybutylene terephthalate, polycarbonate, polyimide, polyacrylate, polyphenylene sulfide and polyether ether ketone.

14. A structure as set forth in claim 12 wherein said matrix polymer is a duromer material selected from the group consisting of polyurethane, unsaturated polyesters, epoxy resins, phenolic resins, an amino plastic and a novolak resin.

15. A structure as set forth in claim 1 wherein each structural member is selected from the group consisting of rods, pipes, bars, sections, flat structure, plates, laminates, honeycombs and grids.

16. A structure as set forth in claim 1 wherein at least one structural element has a surface diffused into layer of polymer material.

17. A process for producing a structure comprising the steps of
   assembling a plurality of fiber-reinforced plastic structural elements into a load bearing structure; and
   molding at least one layer of thermoplastic polymer material to and between at least some of said structural elements.

18. A process as set forth in claim 17 which further comprises the steps of molding an additional layer of thermoplastic polymer material onto said one layer, said additional layer having a less rigidity than said one layer.

19. A process as set forth in claim 17 wherein the structure is a vehicle body.

* * * * *

UNITED STATES PATENT AND TRADEMARK OFFICE
CERTIFICATE OF CORRECTION

PATENT NO. : 6,299,246 B1
DATED : October 9, 2001
INVENTOR(S) : Ivan Tomka

It is certified that error appears in the above-identified patent and that said Letters Patent is hereby corrected as shown below:

Column 1,
Lines 54 and 55, cancel "According. . . structure."
Line 59, change "connecting" to -- connected --

Signed and Sealed this

Second Day of July, 2002

Attest:

Attesting Officer

JAMES E. ROGAN
Director of the United States Patent and Trademark Office